United States Patent
Komatsu et al.

(10) Patent No.: US 9,965,599 B2
(45) Date of Patent: May 8, 2018

(54) FUNCTION SETTING METHOD

(71) Applicant: Panasonic Intellectual Property Management Co., Ltd., Osaka (JP)

(72) Inventors: Takamichi Komatsu, Osaka (JP); Tatsuya Ikeda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 14/903,520

(22) PCT Filed: Jul. 16, 2014

(86) PCT No.: PCT/JP2014/003759
§ 371 (c)(1),
(2) Date: Jan. 7, 2016

(87) PCT Pub. No.: WO2015/011896
PCT Pub. Date: Jan. 29, 2015

(65) Prior Publication Data
US 2016/0162667 A1    Jun. 9, 2016

(30) Foreign Application Priority Data
Jul. 23, 2013 (JP) .................. 2013-152493

(51) Int. Cl.
*G06F 21/10* (2013.01)
*H04L 29/06* (2006.01)

(52) U.S. Cl.
CPC ........... *G06F 21/105* (2013.01); *H04L 63/08* (2013.01); *G06F 2221/0797* (2013.01)

(58) Field of Classification Search
CPC . G06F 21/105; G06F 2221/0797; H04L 63/08
See application file for complete search history.

(56) References Cited

U.S. PATENT DOCUMENTS

| 7,113,720 B2 | 9/2006 | Hirano |
| 7,254,354 B2 | 8/2007 | Hirano |

(Continued)

FOREIGN PATENT DOCUMENTS

| EP | 1 857 951 | 11/2007 |
| JP | 7-325713 | 12/1995 |

(Continued)

OTHER PUBLICATIONS

International Search Report of PCT application No. PCT/JP2014/003759 dated Oct. 21, 2014.

(Continued)

*Primary Examiner* — Catherine B Thiaw
(74) *Attorney, Agent, or Firm* — Wenderoth, Lind & Ponack, L.L.P.

(57) ABSTRACT

A method of setting function includes first to fourth steps. The first step connects a recording medium to a first electrical apparatus having an optional function either disabled or temporarily enabled, the recording medium containing license information to enable the optional function. The second step allows first electrical apparatus to authenticate the license information. The third step, subsequent to the second step, enables the optional function of the first electrical apparatus. The fourth step, subsequent to the third step, records the optional function as having been authenticated in the license information.

6 Claims, 11 Drawing Sheets

(56) References Cited

U.S. PATENT DOCUMENTS

| | | |
|---|---|---|
| 7,415,217 B2 | 8/2008 | Hirano |
| 7,730,306 B2 | 6/2010 | Fujino |
| 7,757,937 B2 | 7/2010 | Akiba |
| 7,831,166 B2 | 11/2010 | Hirano |
| 7,884,961 B2 | 2/2011 | Fujikura et al. |
| 8,549,636 B2 | 10/2013 | Nakai |
| 2004/0128252 A1 | 7/2004 | Shirai et al. |
| 2005/0008386 A1 | 1/2005 | Hirano |
| 2005/0244002 A1* | 11/2005 | Hori ............... G06F 21/10 380/201 |
| 2006/0275047 A1 | 12/2006 | Hirano |
| 2007/0192868 A1 | 8/2007 | Fujino |
| 2007/0253725 A1 | 11/2007 | Hirano |
| 2008/0002221 A1 | 1/2008 | Fujikura et al. |
| 2008/0222258 A1* | 9/2008 | Kwon ............... G06F 21/10 709/206 |
| 2008/0285089 A1 | 11/2008 | Hirano |
| 2009/0020600 A1 | 1/2009 | Akiba |
| 2009/0274304 A1 | 11/2009 | Kobayashi |
| 2010/0211945 A1* | 8/2010 | Doui ............... G06F 21/121 717/176 |
| 2010/0217974 A1* | 8/2010 | Fujimoto ............... G06F 21/10 713/155 |
| 2010/0332724 A1* | 12/2010 | Widergren ............... G11C 7/16 711/102 |
| 2011/0078800 A1* | 3/2011 | Ko ............... G06F 21/10 726/26 |
| 2011/0178619 A1 | 7/2011 | Jung et al. |
| 2011/0296405 A1* | 12/2011 | Ogura ............... G06F 21/105 717/178 |
| 2012/0060225 A1* | 3/2012 | Chu ............... G06F 21/10 726/26 |
| 2012/0092729 A1* | 4/2012 | Sakai ............... G06F 21/105 358/1.16 |
| 2012/0260334 A1 | 10/2012 | Nakai |
| 2012/0317418 A1* | 12/2012 | Brundridge ........... H04L 9/3247 713/176 |
| 2015/0269360 A1* | 9/2015 | Abe ............... G06F 21/604 713/193 |

FOREIGN PATENT DOCUMENTS

| | | |
|---|---|---|
| JP | 2002-236668 | 8/2002 |
| JP | 2003-058486 | 2/2003 |
| JP | 2005-031812 | 2/2005 |
| JP | 2006-202017 | 8/2006 |
| JP | 2006-277087 | 10/2006 |
| JP | 2006-338591 | 12/2006 |
| JP | 2008-027116 | 2/2008 |
| JP | 2009-026074 | 2/2009 |
| JP | 4616784 B | 1/2011 |
| JP | 2012-221240 | 11/2012 |
| JP | 2013-050842 | 3/2013 |

OTHER PUBLICATIONS

Extended European Search Report dated Apr. 4, 2016 in corresponding European Application No. 14830028.8.

* cited by examiner

FIG. 5

| Option | State | Serial number | Effective time |
|---|---|---|---|
| Function A | Enabled | xxxx-xxxx | |
| Function B | Disabled | | |
| Function C | Disabled | | |
| : | | | |

Close

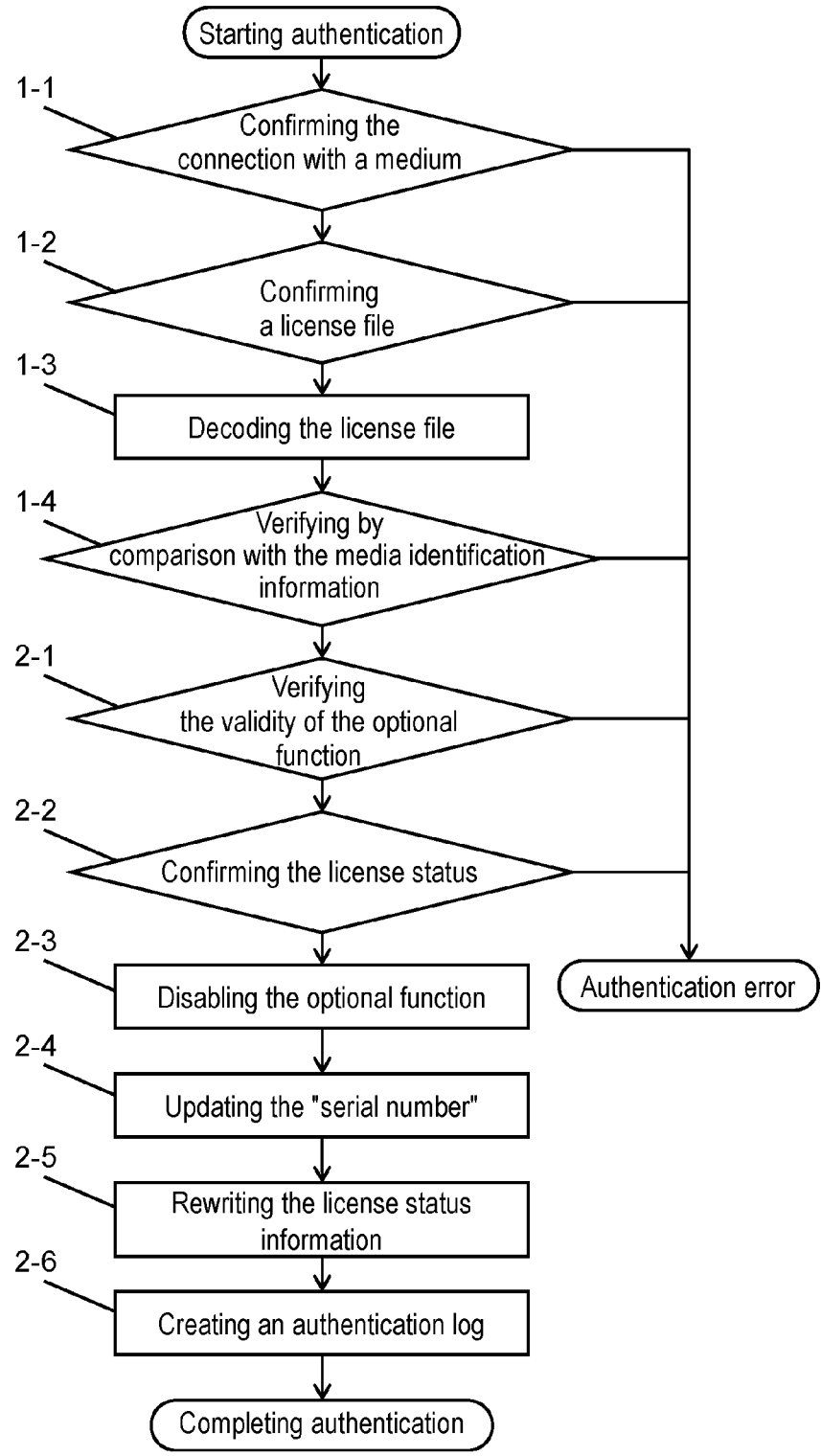

FIG. 8

| Option | State | Serial number | Effective time |
|---|---|---|---|
| Function A | Enabled | xxxx-xxxx | |
| Function B | Temporarily enabled | | 10 Hours |
| Function C | Temporarily enabled | | 50 Hours |
| : | | | |

Close

FIG. 9

Some functions are temporarily enabled.
Check the remaining effective times.

OK

FUNCTION SETTING METHOD

TECHNICAL FIELD

The present disclosure relates to a method of setting function, and more particularly, to a method of enabling and disabling optional function.

BACKGROUND ART

Many function-integrated electrical apparatuses (hereinafter, simply "the electrical apparatuses") include a plurality of functions in one product. The functions include standard functions, which all users can use, and optional functions, which users who have bought a license can use. All the functions of the electrical apparatuses are installed in the factory, and the optional functions are enabled only when the user sets special settings. This is because the hardware configuration of the electrical apparatuses makes it difficult to add additional functions after factory shipment.

The electrical apparatuses have individual use and functions, and also have specific specifications for memory and other components. These specifications are difficult to change later on.

A method of authenticating and enabling an optional function of an electrical apparatus via the Internet will now be described with reference to FIG. 14.

FIG. 14 is a diagram showing how to enable an optional function via the Internet in a conventional electrical apparatus. This electrical apparatus is connected via the Internet to a license management server that manages licenses for individual optional functions. Upon receiving the serial number of an optional function entered by the user, the electrical apparatus sends the serial number to the license management server. The license management server determines whether the received serial number is valid and also whether it has been used before by another electrical apparatus. When determining that the serial number is valid, the license management server enables the optional function of the electrical apparatus.

This approach, however, is ineffective when the electrical apparatus has no hardware that can connect to the Internet or when the electrical apparatus is in the environment without Internet connection. Another problem is that to establish and operate a license management server takes initial and operational costs.

The controller of an industrial robot, which is as an example of the electrical apparatus, is not always in the environment connected to the Internet. As a result, to enable an optional function requires a person from the industrial robot manufacturer to visit the manufacturing premise where the industrial robot is installed, for setting. One proposed authentication method performed by the person from the manufacturer is to use a recording medium (see, for example, PTL 1). According to this method, the person uses a recording medium containing information to authenticate the person. When the authentication information is determined to be correct, the person is allowed to access the highly-confidential information inside the controller of the industrial robot. Thus, the person from the manufacturer brings a recording medium to the manufacturing premise where the industrial robot is installed and then performs an authentication procedure to enable the optional function.

CITATION LIST

Patent Literature

PTL 1: Japanese Unexamined Patent Publication No. 2002-236668

SUMMARY OF THE INVENTION

The method described in PTL 1 requires the person from the manufacturer to take the trouble to visit the manufacturing premise. In addition, the user is not allowed to use an optional function immediately when he/she wants to.

To solve the above problem, it is an object of the present disclosure to provide a method of enabling and disabling optional functions without the need for the person from the manufacturer to visit the manufacturing premise.

To solve the above problem, the method of setting function according to the present disclosure includes first to fourth steps. The first step connects a recording medium to a first electrical apparatus having an optional function either disabled or temporarily enabled, the recording medium containing license information to enable the optional function. The second step allows the first electrical apparatus to authenticate the license information. The third step, subsequent to the second step, enables the optional function of the first electrical apparatus. The fourth step, subsequent to the third step, records the optional function as having been authenticated in the license information.

As described above, the present disclosure allows the user to set an optional function using a recording medium without the need for a person from the manufacturer to visit the manufacturing premise. The user is also allowed to use the optional function immediately when he/she wants to.

BRIEF DESCRIPTION OF DRAWINGS

FIG. 5 is a diagram showing how to see the enabled optional function in the first exemplary embodiment.

FIG. 6 is a flowchart of a process of disabling an optional function by authentication in a second exemplary embodiment.

FIG. 8 is a diagram showing how to see "effective times" of optional functions that have been temporarily enabled in a third exemplary embodiment.

FIG. 9 is a diagram informing the user of optional functions that have been temporarily enabled in the third exemplary embodiment.

DESCRIPTION OF EMBODIMENTS

First Exemplary Embodiment

Figure 1:
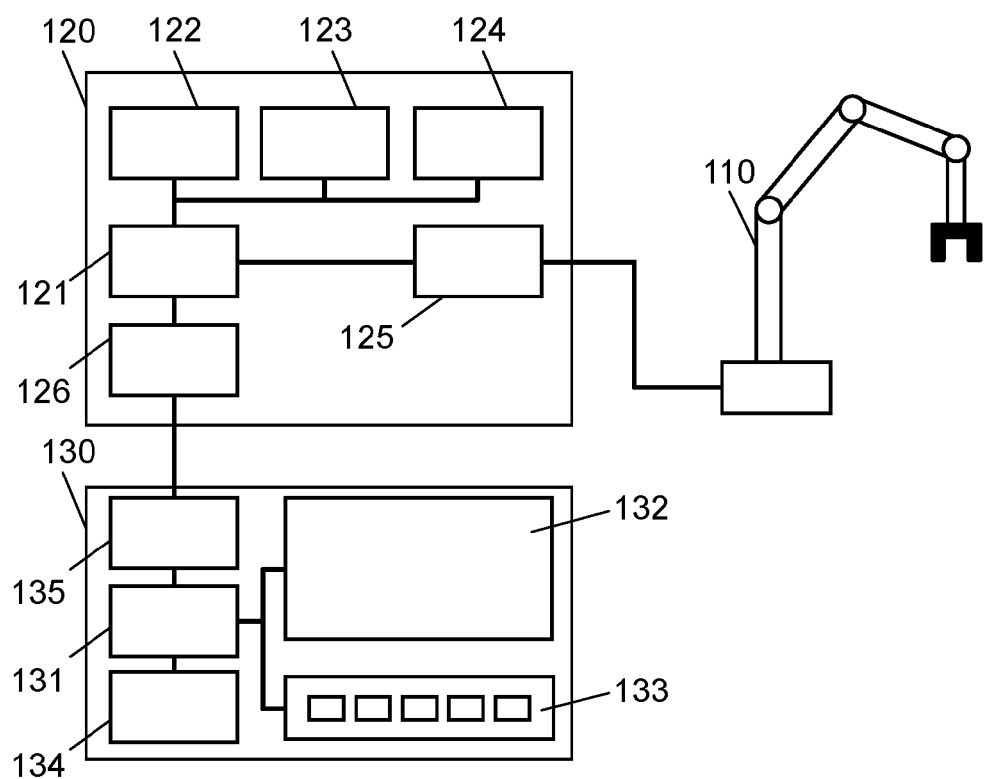
FIG. 1 is a schematic configuration view of an industrial robot system used in a first exemplary embodiment.
Figure 2:
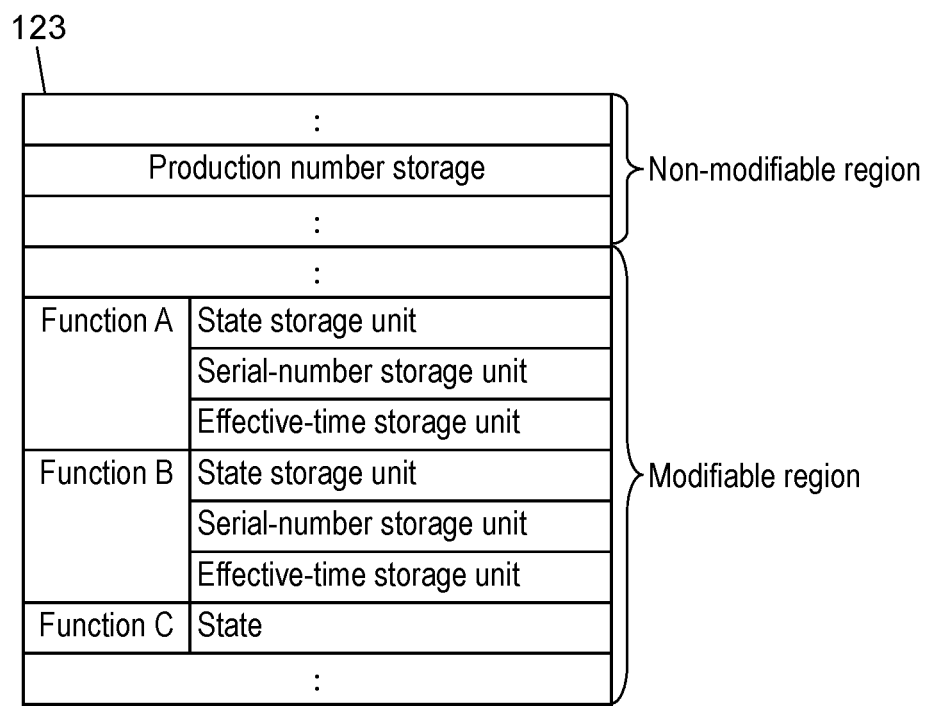
FIG. 2 is a schematic configuration view of a nonvolatile memory unit used in the first exemplary embodiment.
Figure 3:
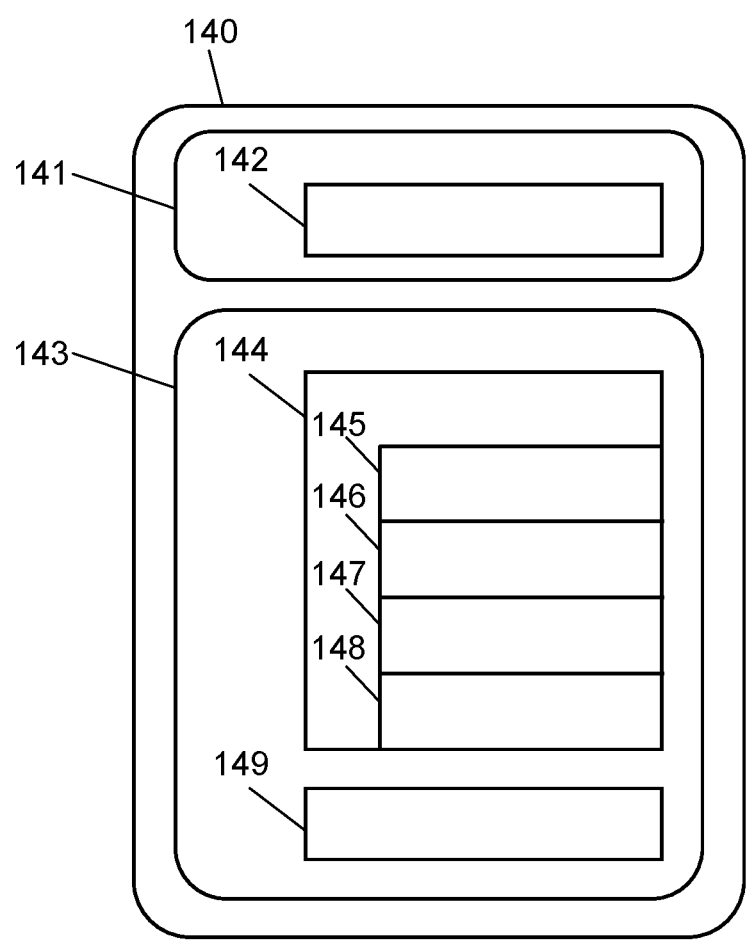
FIG. 3 is a schematic configuration view of a recording medium used in the first exemplary embodiment.
Figure 4:
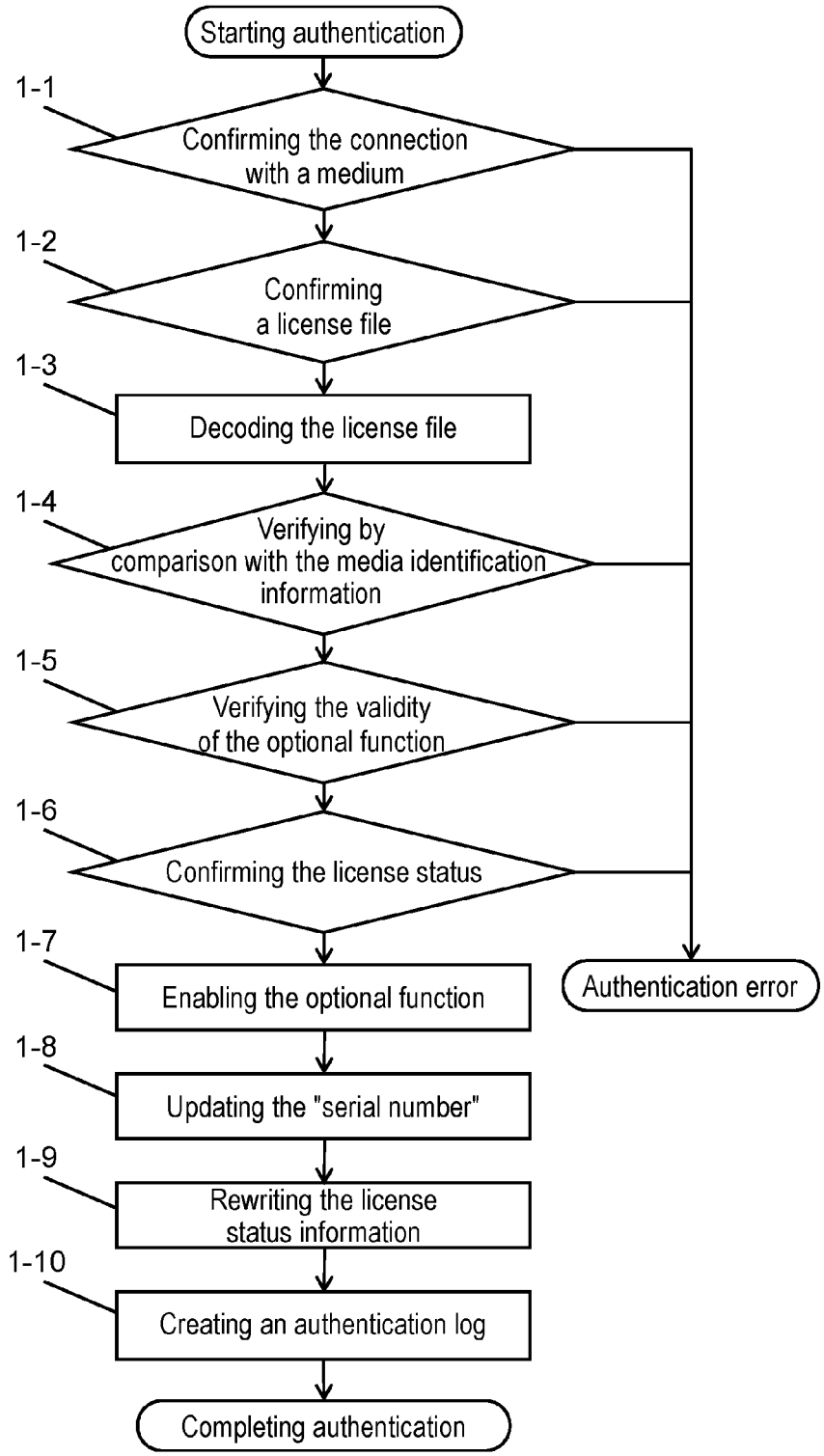
FIG. 4 is a flowchart of a process of enabling an optional function by authentication in the first exemplary embodiment.

The present exemplary embodiment will now be described with reference to FIGS. 1 to 5. FIG. 1 is a schematic configuration view of an industrial robot system. FIG. 2 is a schematic configuration view of a nonvolatile memory unit. FIG. 3 is a schematic configuration view of a recording medium. FIG. 4 is a flowchart of a process of enabling an optional function by authentication. FIG. 5 is a diagram showing how to see the enabled optional function.

As shown in FIG. 1, an industrial robot system (first electrical apparatus) includes manipulator 110, controller 120, and teach pendant 130. Manipulator 110, which includes a plurality of servo motors, performs tasks such as welding and carrying.

Controller 120 includes calculator 121, volatile memory unit 122, nonvolatile memory unit 123, power-on-time measurement unit 124, servo amplifier 125, and communication unit 126. Calculator 121, which includes a CPU, is connected to each of volatile memory unit 122, nonvolatile memory unit 123, power-on-time measurement unit 124, servo amplifier 125, and communication unit 126. Volatile memory unit 122 stores temporary data used for calculation. Nonvolatile memory unit 123 stores "setting data" of controller 120. Power-on-time measurement unit 124 measures the power on time of controller 120. Servo amplifier 125 drives the servo motors of manipulator 110. Communication unit 126 communicates with teach pendant 130. Controller 120 calculates the operating quantity and speed of the manipulator under the direction of teach pendant 130, and drives manipulator 110 via servo amplifier 125.

As shown in FIG. 2, nonvolatile memory unit 123 for storing the "setting data" has a non-modifiable region and a modifiable region. The non-modifiable region contains data that is set by the manufacturer before shipment and cannot be modified later on, whereas the modifiable region contains data that can be modified after shipment. Controller 120 has a unique "production number", which is stored in a production number storage located in the non-modifiable region. Controller 120 has various optional functions besides standard functions. As shown in FIG. 2, the modifiable region of nonvolatile memory unit 123 includes storage units for storing the information of each of functions A, B, and C, which are optional functions. The function information includes a "status" indicating whether the function is in the enabled state or disabled state; a "serial number" unique to the function; and an "effective time" indicating the time during which the function can be in the enabled state. If controller 120 has calendar and clock functions, the "effective time" may indicate the expiration date (and time). If controller 120 does not have them, the "effective time" indicates the length of time during which the function has been in the enabled state. If the "effective time" has no limitation, the effective-time storage unit can be blank. Controller 120 cannot activate optional functions that are not recorded as being enabled (i.e., that are recorded as being disabled) in the state storage unit of nonvolatile memory unit 123.

As shown back in FIG. 1, teach pendant 130 includes calculator 131, setting data display unit 132, operating unit 133, media connection unit 134, and communication unit 135. Calculator 131, which includes a CPU, is connected to each of setting data display unit 132, operating unit 133, media connection unit 134, and communication unit 135. Setting data display unit 132 displays for the user the "setting data" stored in nonvolatile memory unit 123 of controller 120. Operating unit 133 is operated by the user, who watches setting data display unit 132. Media connection unit 134 is connected to recording medium 140 (not shown). Communication unit 135 communicates with controller 120.

Teach pendant 130 acquires the "setting data" stored in the modifiable region of nonvolatile memory unit 123 from controller 120 via communication unit 135, and displays the data on setting data display unit 132. The user operates operating unit 133 while referring to the "setting data" displayed on setting data display unit 132, and modifies the contents of the "setting data". The modified "setting data" is sent back via communication unit 135 to controller 120, which modifies data in the modifiable region of nonvolatile memory unit 123. Note that the data in the non-modifiable region is displayed on setting data display unit 132, but cannot be modified by the user.

As shown in FIG. 3, recording medium 140 includes memory regions 141 and 143. The data in memory region 141 is written by the manufacturer and can only be read by the user, whereas the data in memory region 143 can be read and written by the user. Memory region 141 stores individual identification information 142 unique to recording medium 140. Memory region 143 stores license file 144 and authentication log file 149. License file 144 contains the license information of optional functions, whereas authentication log file 149 contains the history of the authentication procedure.

The license information in license file 144 includes media identification information 145, option information 146, optional-function serial-number information 147, and license status information 148. The media identification information indicates which recording medium license file 144 belongs to. Option information 146 indicates for which optional function each license is granted. Optional-function serial-number information 147 indicates the serial number of each optional function. License status information 148 indicates whether each license has been transferred to controller 120. The data contained in license file 144 is encrypted so that the user cannot easily understand it.

The following is a description of how the user can modify the "state" of the optional function using controller 120, teach pendant 130, and recording medium 140 described above.

First, the user receives recording medium 140 for modifying the "state" of optional functions from the manufacturer, and connects recording medium 140 to media connection unit 134 of teach pendant 130 (a first step). Next, the user starts authentication using operating unit 133 of teach pendant 130.

Once the authentication is started, calculator 131 of teach pendant 130 proceeds the authentication process as shown in the flowchart of FIG. 4.

First, calculator 131 confirms the connection between media connection unit 134 and recording medium 140 (STEP 1-1). Next, calculator 131 confirms the presence of license file 144 (STEP 1-2). Next, calculator 131 decodes the data stored in license file 144 (STEP 1-3). Next, calculator 131 verifies individual identification information 142 contained in memory region 141 by comparing it with media identification information 145 contained in license file 144 (STEP 1-4). This verification determines whether license file 144 has been copied from another recording medium.

Next, calculator 131 reads option information 146 and verifies the validity of the optional function to be enabled (STEP 1-5). The details will be described as follows. An optional function may compete with another optional function, or the user may forget that he/she has already enabled the optional function that he/she is going to enable. Thus, STEP 1-5 verifies the consistency and validity between the optional function that is going to be enabled and the other optional functions, which are either enabled or disabled.

Next, license status information 148 is read to confirm whether this information is "Authenticable" or not (STEP 1-6). Only when the authentications in STEPs 1-1 to 1-6 are performed without problems, the process proceeds to the next step. If any of the authentications have a problem, this is determined to be an authentication error, and the process is discontinued. STEPs 1-1 to 1-6 are referred to as a second step.

When the authentications in STEPs 1-1 to 1-6 are performed without problems, the following steps are performed. In the following description, the function A is authenticated as an optional function. First, calculator 131 of teach pendant 130 sends a command to enable the function A to controller 120 via communication unit 135. Calculator 121 of controller 120 writes in the state storage unit assigned for the function A in nonvolatile memory unit 123 that the function A has been enabled by the authentications in STEPs 1-1 to 1-6 (STEP 1-7).

Next, calculator 121 updates the "serial number" contained in the serial-number storage unit assigned for the function A in nonvolatile memory unit 123 (STEP 1-8). The details will be described as follows. Calculator 131 reads the "serial number" of the function A from optional-function serial-number information 147 stored in license file 144 of recording medium 140, and informs controller 120 of the "serial number". Calculator 121 of controller 120 writes the obtained "serial number" to the serial-number storage unit assigned for the function A in nonvolatile memory unit 123. Simultaneously with STEP 1-7 or 1-8, calculator 121 may write the "effective time" to the effective-time storage unit assigned for the function A in nonvolatile memory unit 123. If controller 120 has calendar and clock functions, the expiration date (and time) is stored as the "effective time" in the effective-time storage unit and is managed. Alternatively, the length of time during which the function can be enabled may be stored in the effective-time storage unit and the time during which the function has been enabled may be monitored whether or not controller 120 has the calendar and clock functions. Such a setting of the "effective time" enables the manufacturer to sell a fixed-term license or to provide a license to a different industrial robot only while the industrial robot having the enabled optional function is under repair. If the function has no "effective time", the effective-time storage unit may be blank. STEPs 1-7 and 1-8 are referred to as a third step.

Next, calculator 131 rewrites license status information 148 contained in license file 144 of recording medium 140 to "Authenticated", which indicates that the license has been transferred to controller 120 (STEP 1-9). Thus, license file 144 of recording medium 140 is shown as "Authenticated". As a result, if the same authentications are performed on a different controller 120 using recording medium 140, STEP 1-6 determines that recording medium 140 is not valid. Thus, recording medium 140 cannot enable the function A, which is an optional function of the different controller 120.

Finally, the history (first log) of the authentication procedure is written to authentication log file 149 of recording medium 140 so as to complete the authentication process (STEP 1-10). If recording medium 140 does not contain authentication log file 149, a new file is created to write the history of the authentication procedure. When recording medium 140 contains authentication log file 149, the history is additionally written into the existing contents. The data to be additionally written include: (1) the date and time of authentication, (2) the enabled optional function, (3) the "serial number" of the enabled optional function, and (4) the "production number" of the controller to which the optional function has been authenticated. The user can check authentication log file 149 even after authentication to find when and what function was authenticated and to which controller 120 the function was authenticated. STEPs 1-9 and 1-10 are referred to as a fourth step.

The following is a description of how to verify the license granted in controller 120. Nonvolatile memory unit 123 of controller 120 contains the "state" of the optional function enabled in STEP 1-7 of FIG. 4. Nonvolatile memory unit 123 further contains optional-function serial-number information 147, which is the "serial number" of the optional function enabled in STEP 1-8 of FIG. 4. Nonvolatile memory unit 123 further contains the "effective time" either as the expiration date or as the time during which the function can be enabled and the time during which the function has been enabled, as necessary.

The user verifies the license using operating unit 133 of teach pendant 130. In response to the license verification by the user, calculator 131 makes a request for the option setting information (such as "state", "production number", and "effective time") to controller 120 via communication unit 135. Upon receipt of this request, calculator 121 of controller 120 transmits data of the optional function from nonvolatile memory unit 123 to teach pendant 130. Calculator 131 of teach pendant 130 then displays the transmitted data on setting data display unit 132 as shown in FIG. 5. The user can obtain enabled optional functions, and their "serial numbers" and "effective times" from the display on setting data display unit 132. If the "effective time" is unlimited, only the "state" is enabled, and the "effective time" is not displayed.

The action of the present exemplary embodiment will now be described as follows.

In the present exemplary embodiment, the manufacturer stores the information of the optional functions into license file 144 of recording medium 140, whereas the user can easily modify data in nonvolatile memory unit 123 of controller 120. This allows the user to enable optional function only by receiving recording medium 140 containing license file 144 without the need for a person from the manufacturer to visit the manufacturing premise.

License file 144 employed in the present exemplary embodiment contains individual identification information 142 of recording medium 140, so that recording medium 140 and license file 144 correspond to each other. This correspondence prevents recording medium 140 from being copied to another recording medium, thereby preventing unauthorized use.

License status information 148 in license file 144 records whether the license is "Authenticable" or "Authenticated". If license file 144 once authenticated is authenticated again by a different controller 120, license file 144 is verified as "Authenticated" in STEP 1-6, resulting in an authentication error. This prevents the optional function of the different controller 120 from being enabled. This consequently prevents unauthorized use where optional functions of a plurality of controllers 120 are enabled using a single license file 144.

Second Exemplary Embodiment

Figure 7A:
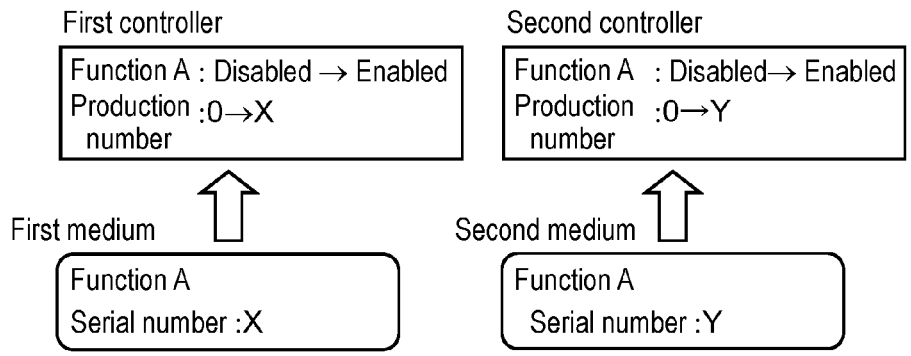
FIG. 7A is a diagram showing how to enable optional functions of a plurality of controllers using a plurality of recording media in the second exemplary embodiment.
Figure 7B:
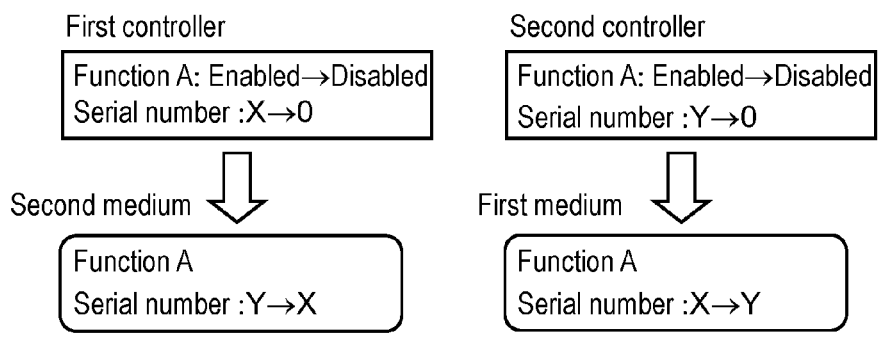
FIG. 7B is a diagram showing how to disable optional functions of a plurality of controllers using a plurality of recording media in the second exemplary embodiment.
Figure 7C:
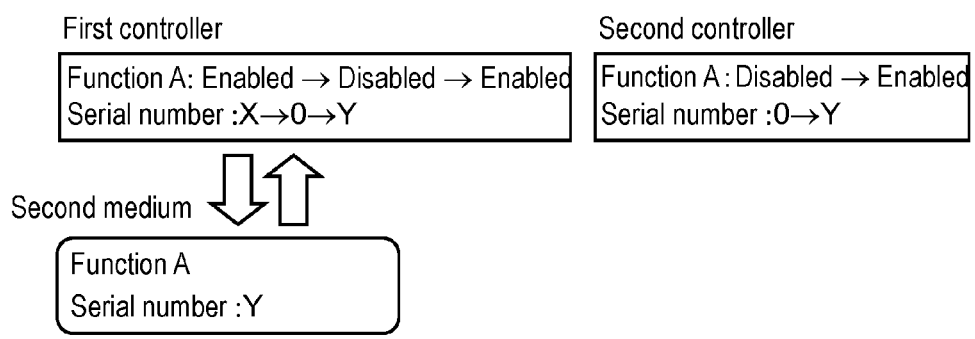
FIG. 7C is a diagram showing an example where the second exemplary embodiment is not used.

The present exemplary embodiment will now be described with reference to FIGS. 6 and 7A to 7C. FIG. 6 is a flowchart of a process of disabling an optional function by authentication. FIG. 7A is a diagram showing how to enable optional functions of a plurality of controllers using a plurality of recording media. FIG. 7B is a diagram showing how to disable optional functions of a plurality of controllers using a plurality of recording media. FIG. 7C is a diagram showing an example where the present exemplary embodiment is not used.

In the present exemplary embodiment, like components are labeled with like reference numerals with respect to the first exemplary embodiment, and these components are not described again in detail. The steps of the present exemplary embodiment are performed after the steps of the first exemplary embodiment.

The first exemplary embodiment has described how to enable an optional function of controller 120 using recording medium 140. In contrast, the present exemplary embodiment will describe how to disable the optional function using recording medium 140. In the present exemplary embodiment, the function A enabled in the first exemplary embodiment will be disabled as an example. First, recording medium 140 is connected to controller 120 (fifth step).

FIG. 6 is a flowchart of a process of disabling an optional function. When the user operates teach pendant 130 in the same manner as in the first exemplary embodiment this time to disable the optional function, the process shown in FIG. 6 is started.

In the same manner as in the first exemplary embodiment, the following steps are performed: confirming the connection with a medium (STEP 1-1); confirming the presence of license file 144 (STEP 1-2); decoding of license file 144 (STEP 1-3); and verifying by comparison with media identification information 145 (STEP 1-4).

Next, the validity of the optional function to be disabled is verified (STEP 2-1). In STEP 1-5 of the first exemplary embodiment, the consistency and validity of enabling the optional function are verified. In contrast, in STEP 2-1 of the present exemplary embodiment, the consistency and validity of disabling the optional function are verified. The optional function may coordinate with another optional function or the user may forget that he/she has already disabled the optional function that he/she is going to disable. Thus, STEP 2-1 verifies the consistency and validity between the optional function that is going to disabled and the other optional functions, which are either enabled or disabled.

Next, the status of license file 144 is determined (STEP 2-2). Assume that the optional function has been normally enabled in accordance with the procedure described in the first exemplary embodiment. In this case, license status information 148 contained in license file 144 of recording medium 140 is shown as "Authenticated" in STEP 1-9 of the first exemplary embodiment. In the present exemplary embodiment, an optional function can be disabled only when license status information 148 is shown as "Authenticated". This avoids mistakenly using a recording medium that has not been authenticated yet.

Only when the authentications in STEPs 1-1 to 1-4 and STEPs 2-1 and 2-2 are performed without problems, the process proceeds to the next step. If any of the authentications have a problem, this is determined to be an authentication error, and the process is discontinued.

When the authentications in STEPs 1-1 to 1-4 and STEPs 2-1 and 2-2 are performed without problems, the following steps are performed. In the following description, the function A continues to be authenticated as an optional function. First, calculator 131 of teach pendant 130 sends a command to disable the function A to controller 120 via communication unit 135. Calculator 121 of controller 120 writes in the state storage unit assigned for the function A in nonvolatile memory unit 123 that the function A has been disabled (STEP 2-3).

Next, calculator 121 updates the "serial number" contained in the serial-number storage unit assigned for the function A in nonvolatile memory unit 123 (STEP 2-4). The details will be described as follows. Calculator 121 reads the "serial number" from the serial-number storage unit assigned for the function A in nonvolatile memory unit 123, and informs calculator 131 of teach pendant 130 of the "serial number". Next, calculator 121 clears the "serial number" in the serial-number storage unit assigned for the function A in nonvolatile memory unit 123. Calculator 131 writes the "serial number" of the function A received from calculator 121 into optional-function serial-number information 147 contained in license file 144 of recording medium 140. Simultaneously with STEP 2-3 or 2-4, calculator 121 may clear the "effective time" from the effective-time storage unit assigned for the function A in nonvolatile memory unit 123. Calculator 121 may alternatively inform calculator 131 of teach pendant 130 of the "effective time" so as to write the "effective time" into license file 144 of recording medium 140. Similar to the first exemplary embodiment, the "effective time" may be either the expiration date (and time) or the length of time during which the function A can be enabled.

Next, calculator 131 rewrites license status information 148 contained in license file 144 of recording medium 140 to "Authenticable", which indicates that the license has been transferred to recording medium 140 (STEP 2-5). Thus, license file 144 of recording medium 140 is shown as "Authenticable". As a result, other controllers 120 are allowed to perform authentications described in the first exemplary embodiment. STEPs 2-3 to 2-5 are referred to as a sixth step.

Finally, an authentication procedure (second log) is written into authentication log file 149 of recording medium 140 so as to complete the authentication process (STEP 2-6, referred to as a seventh step). The data to be written include: (1) the date and time of authentication, (2) the disabled optional function, (3) the serial number of the disabled optional function, and (4) the "production number" of the controller to which the optional function has been authenticated. The user can check authentication log file 149 after authentication to find when and what function was authenticated and to which controller 120 the function was authenticated.

The action of the present exemplary embodiment will now be described as follows.

In the present exemplary embodiment, the user disables the optional function of a controller 120 and enables the optional function of a different controller 120 by a simple operation using license file 144 of recording medium 140 that is also used in the first exemplary embodiment. It is often the case that one factory has a plurality of industrial robot systems, and controllers 120 having optional functions are modified in the factory. The user can easily transfer optional functions between different controllers 120 according to the method described in the present exemplary embodiment.

In the present exemplary embodiment, STEP 2-5 reads the "serial number" of the optional function stored in controller 120, and rewrites license status information 148 contained in license file 144 of recording medium 140. The specific action of this step will now be described with reference to FIGS. 7A to 7C.

The following is a description, with reference to FIG. 7A, of enabling the function A, which is an optional function of two controllers 120 (first and second controllers) in the factory using two recording media (first and second media). In this case, in first controller 120, the function A is enabled in accordance with the contents of license file 144 of the first medium, and the "serial number X" of the function A is stored in first controller 120. In the same manner, in second controller 120, the function A is enabled in accordance with the contents of license file 144 of the second medium, and the "serial number Y" of the function A is stored in second controller 120. The serial numbers X and Y differ from each other.

The function A is disabled as follows. The present exemplary embodiment does not require that the "serial number" of the optional function in each controller 120 be identical to the "serial number" of the optional function in license file 144. As a result, as shown in FIG. 7B, controller 120 can be connected to recording medium 140 different from the recording medium 140 used when the function A has been enabled. In this case, the "serial number" stored in license file 144 can be rewritten into the "serial number" stored in controller 120, so that the "serial number" of the optional function held by the user can be finally returned to the one it was before authentication. More specifically, when the function A of the first controller is disabled using the second medium, the "serial number" of the function A stored in license file 144 of the second medium is changed to the "serial number X". When, on the other hand, the function A of the second controller is disabled using the first medium, the "serial number" of the function A stored in license file 144 of the first medium is changed to the "serial number Y".

The case that the "serial number" is not rewritten will be described as follows with reference to FIG. 7C. Assume that the function A of the first controller is disabled using the second medium, and is then enabled using the second medium as shown in FIG. 7C. This causes the "serial number Y" to be stored in both the first and second controllers.

FIGS. 7A to 7C show two controllers 120, but the actual factory has a larger number of controllers 120. The optional function can be disabled using a recording medium different from the recording medium when it was enabled, thereby greatly improving operating efficiency.

Third Exemplary Embodiment

The present exemplary embodiment will now be described with reference to FIGS. 8 and 9. FIG. 8 is a diagram showing how to see "effective times" of optional functions that have been temporarily enabled. FIG. 9 is a diagram informing the user of optional functions that have been temporarily enabled. In the present exemplary embodiment, like components are labeled with like reference numerals with respect to the first exemplary embodiment, and these components are not described again in detail. The steps of the present exemplary embodiment, which are referred to as an eighth step, are performed before the steps of the first exemplary embodiment.

The first exemplary embodiment has described how to enable an optional function of controller 120 using recording medium 140. In contrast, the present exemplary embodiment will describe how to temporarily enable an optional function without using recording medium 140 before the optional function is enabled using recording medium 140. Cases in which optional functions are enabled without using recording medium 140 include when the user uses an optional function on a trial basis or before receiving recording medium 140.

When the user operates to temporarily enable an optional function using operating unit 133 of teach pendant 130, setting data display unit 132 displays a selection screen indicating which optional function to be enabled. Using operating unit 133, the user selects an optional function to be enabled from those displayed on the selection screen. Note that the selection screen shows only the optional functions that need to be temporarily enabled. In other words, the selection screen does not show the optional functions that have already been enabled, have already been temporarily enabled, and were once temporarily enabled.

The present exemplary embodiment takes the case of temporarily enabling the function B as an example of an optional function. When the user temporarily enables the function B, calculator 131 of teach pendant 130 informs calculator 121 of controller 120 that the function B has been temporarily enabled. Calculator 121 of controller 120 writes that the function B has been temporarily enabled into the state storage unit assigned for the function B in nonvolatile memory unit 123.

Next, the "effective time" predetermined by the program is written into the effective-time storage unit assigned for the function B in nonvolatile memory unit 123. The "effective time" to be written is the number of counts corresponding to the sampling time, which is predetermined by the program and is to be monitored. For example, when the "effective time" is 100 hours and the sampling time is monitored every second, the "effective time" to be written is "360000" (100×60×60).

The "effective time" is monitored as follows. Power-on-time measurement unit 124 of controller 120, which starts simultaneously with controller 120, measures the time during which controller 120 is running. Calculator 121 reduces the temporarily-enabled" effective time" assigned for the function B in nonvolatile memory unit 123 by one count at every sampling time (for example, every second). Calculator 121 continues the countdown while controller 120 is running. When the default time (for example, 100 hours) has passed since the countdown started, the "effective time" is made 0. When the "effective time" becomes 0, calculator 121 informs calculator 131 of teach pendant 130 that the "effective time" of the function B has passed, and writes "disabled" into the state storage unit assigned for the function B in nonvolatile memory unit 123. As a result, the function B is disabled (becomes unusable). Upon being informed from controller 120, calculator 131 of teach pendant 130 makes display unit 132 display the setting data, thereby informing the user that the function B has been disabled.

The following is a description of how to check the optional function that has been temporarily enabled by the user, and the remaining time of the "effective time". The following is a particular case in which the functions B and C, which are optional functions, are temporarily enabled. The functions B and C have effective times of 10 hours and 50 hours, respectively.

The user checks the "state" of these optional functions using operating unit 133 of teach pendant 130. Calculator 131 makes a request for various option setting information ("state", "serial number", "effective time") to controller 120 via communication unit 135. Upon receiving this request, calculator 121 of controller 120 transmits the data of the optional functions from nonvolatile memory unit 123 to teach pendant 130. Calculator 131 of teach pendant 130 makes setting data display unit 132 display the received data as shown in FIG. 8. The display on setting data display unit 132 allows the user to check which of the optional functions has been temporarily enabled and also how much the remaining time of the "effective time". When the "effective time" is unlimited, only the "state" is enabled, and the "effective time" is not displayed.

Controller 120 checks nonvolatile memory unit 123 when controller 120 is powered on. If there is at least one function temporarily enabled in nonvolatile memory unit 123, controller 120 informs teach pendant 130 of it in the initial communication with teach pendant 130. When its own initialization is completed, teach pendant 130 makes setting data display unit 132 display a warning indicating that there are some temporarily-enabled functions as shown in FIG. 9. The warning displayed on setting data display unit 132 at the power-on of controller 120 allows the user to recognize the temporarily-enabled functions.

The effective times of the temporarily-enabled functions in the present exemplary embodiment can be eliminated (enabled for an unlimited period of time) by the authentication using the recording medium described in the first exemplary embodiment.

The action of the present exemplary embodiment will now be described as follows.

In the present exemplary embodiment, optional functions are temporarily enabled without recording medium 140 containing license file 144. The effective-time storage unit in nonvolatile memory unit 123 of controller 120 stores the "effective time", and power-on-time measurement unit 124 measures the time during which controller 120 is running. Updating the number of counts of nonvolatile memory unit 123 at every sampling time (for example, every second) can achieve temporary enabling of optional functions. In the present exemplary embodiment, the "effective time" is calculated with reference to the time during which controller 120 is running on the assumption that controller 120 does not have calendar and clock functions to record the exact date and time. If, however, controller 120 has such calendar and clock functions, the expiration date (and time) can be determined.

Fourth Exemplary Embodiment

Figure 10:
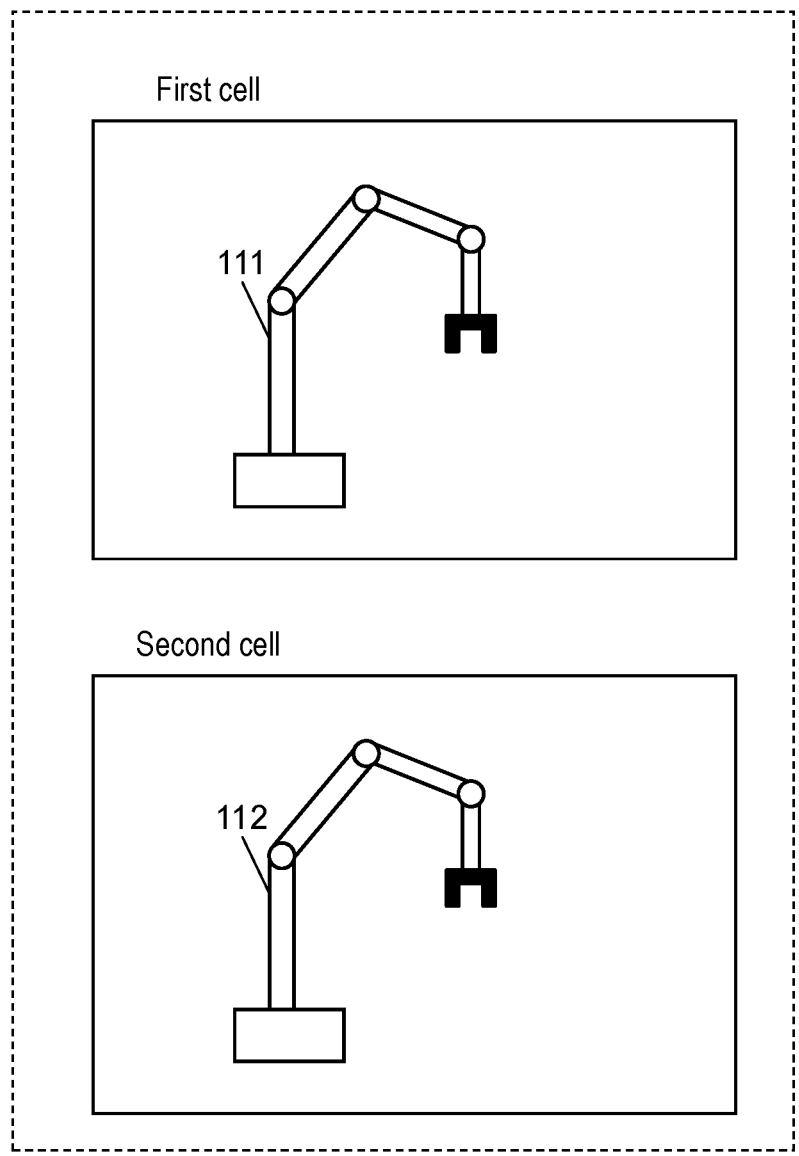
FIG. 10 is a diagram showing a plurality of cells used in a manufacturing premise in a fourth exemplary embodiment.
Figure 11:
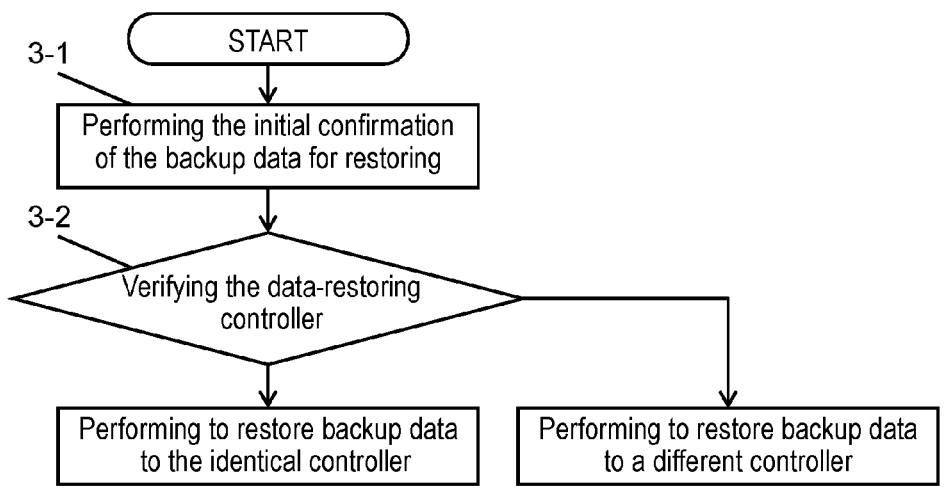
FIG. 11 is a flowchart of a process of restoring backup data in the fourth exemplary embodiment.
Figure 12:
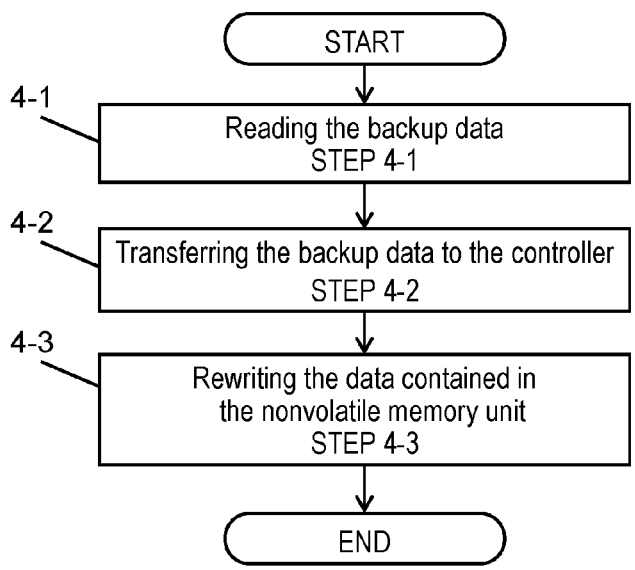
FIG. 12 is a flowchart of a process in which backup data is restored to a controller which has stored the backup data in the fourth exemplary embodiment.
Figure 13:
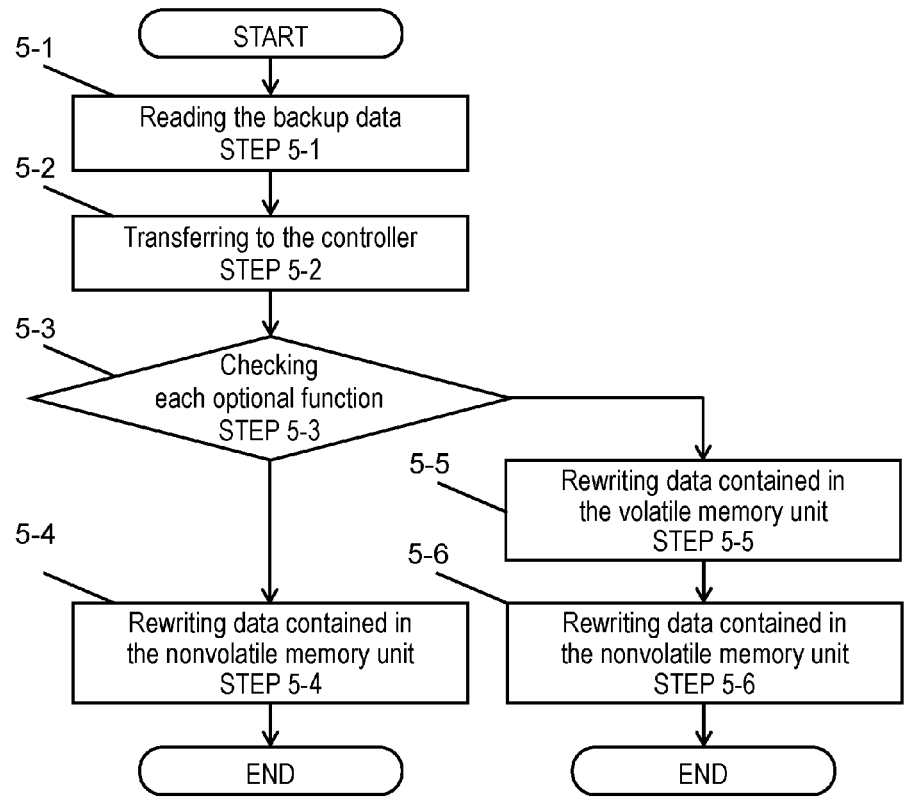
FIG. 13 is a flowchart of a process in which backup data is restored to a controller different from a controller which has stored the backup data in the fourth exemplary embodiment.
Figure 14:
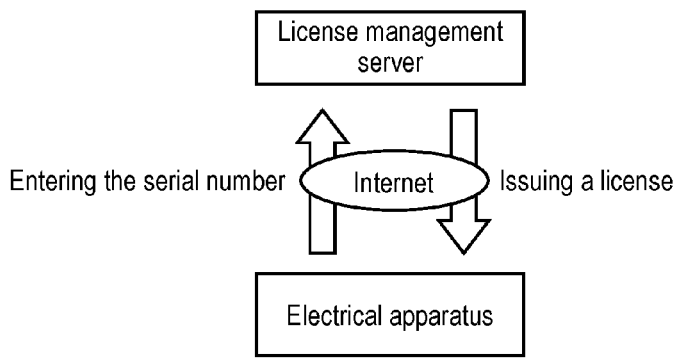
FIG. 14 is a diagram showing how to enable an optional function via the Internet in a conventional electrical apparatus.

The present exemplary embodiment will now be described with reference to FIGS. 10 to 13. FIG. 10 is a diagram showing a plurality of cells used in a manufacturing premise. FIG. 11 is a flowchart of a process of restoring backup data. FIG. 12 is a flowchart of a process in which backup data is restored to a controller which has stored the backup data. FIG. 13 is a flowchart of a process in which backup data is restored to a controller different from a controller which has stored the backup data. In the present exemplary embodiment, like components are labeled with like reference numerals with respect to the first exemplary embodiment, and these components are not described again in detail.

The first to third exemplary embodiments have described enabling, disabling, and temporarily enabling optional functions. The present exemplary embodiment will describe the maintenance of an industrial robot system having enabled optional functions.

General industrial robots have backup data in case of data loss. Besides recovering lost data, backup data can be used in the following case. Backup data includes the "production number" and option setting information ("state", "serial number", "effective time") of a controller, and a setup program.

FIG. 10 shows an example of a productive facility with two industrial robots. In some cases, a plurality of cells including industrial robots performing the same task are used to improve productivity. In the present exemplary embodiment, first industrial robot 111 (first electrical apparatus) in a first cell and second industrial robot 112 (second electrical apparatus) in a second cell perform the same task. Conventionally, the first and second cells are set up separately so that the first and second industrial robots 111 and 112 can perform the same task. On the other hand, using the backup data produced in the setup of the first cell allows efficient setup of the second cell. More specifically, various settings and teachings for machining workpieces are applied to first industrial robot 111 to complete the setup of the first cell. Next, the backup data produced in the setup of the first cell is reflected on (copied to) the second cell so as to setup the second cell. Thus, second industrial robot 112 in the second cell has the same settings as first industrial robot 111 in the first cell.

The saving and reflection of the backup data in the present exemplary embodiment will now be described.

First, the process of saving the backup data will be described as follows. To save backup data, the user connects a recording medium to media connection unit 134 of teach pendant 130 in the setup cell, and then operates operating unit 133. As a result, the backup data starts to be saved.

When the process of saving the backup data starts, calculator 131 of teach pendant 130 sends the command to save the backup data to calculator 121 of controller 120. Calculator 121 reads the entire contents of nonvolatile memory unit 123, and produces backup data. The produced backup data is sent to calculator 131 of teach pendant 130 via communication unit 126. Calculator 131 writes the backup data received from controller 120 sequentially into the recording medium connected to media connection unit 134. This completes the saving of the backup data to the recording medium in the setup cell. The saving of the backup data to the recording medium by the second electrical apparatus is referred to as a ninth step.

The process of restoring the saved backup data will now be described with reference to the flowcharts shown in FIGS. 11 to 13. To restore the backup data, the user connects the recording medium containing the backup data to media connection unit 134 of teach pendant 130 of a cell that has not been set up yet, and then operates operating unit 133. As a result, the backup data starts to be restored.

When the process of restoring the backup data is started, calculator 131 of teach pendant 130 performs initial confirmation to verify the connection between the recording medium and media connection unit 134, and also to verify that the recording medium contains the backup data (STEP 3-1). When the initial conformation is completed, calculator 131 verifies the controller 120 to which the backup data is going to be restored (STEP 3-2). The backup data includes all the data of nonvolatile memory unit 123 including the data stored in the non-modifiable region such as the "production number" of controller 120. As a result, the backup data can be checked to find out whether the controller 120 to which the backup data is going to be restored is identical to the controller 120 from which the backup data has been obtained. The details will be described as follows. A comparison is made between the controller's "production number" contained in the non-modifiable region of the backup data of the recording medium and the controller's "production number" contained in the non-modifiable region of nonvolatile memory unit 123 of the controller 120 to which the backup data is going to be restored. Assume that the controller from which the backup data has been obtained (hereinafter, the data-saving controller) agrees with the controller to which the backup data is going to be restored (hereinafter, the data-restoring controller). In short, assume that STEP 3-2 determines that the data-saving controller and the data-restoring controller are identical to each other. In this case, the backup data is restored to the same controller 120, indicating that the purpose of the restoration is system recovery. When, on the other hand, the data-saving controller and the data-restoring controller disagree with each other (i.e., STEP 3-2 determines that these controllers are different from each other), the purpose of the restoration is to set up another cell.

First, the process of restoring the backup data in the same controller will now be described with reference to the flowchart of FIG. 12. When STEP 3-2 determines that the data-saving controller and the data-restoring controller are identical to each other, calculator 131 of teach pendant 130 reads the backup data from the recording medium (STEP 4-1). Calculator 131 transmits the read backup data to controller 120 via communication unit 135. Then calculator 121 of controller 120 temporarily stores the received backup data in volatile memory unit 122 (STEP 4-2). Calculator 121 then reads only the data contained in the modifiable region from the backup data stored in volatile memory unit 122, and sequentially rewrites the data in the modifiable region of nonvolatile memory unit 123 (STEP 4-3). As a result, the data in the modifiable region of nonvolatile memory unit 123 is returned to the state it was when the backup data was saved, so that various settings and teaching files can be recovered.

Next, the process of restoring the backup data to a different controller will now be described with reference to the flowchart of FIG. 13. In restoring the backup data, the reading of the backup data (STEP 5-1) and the transfer of it to controller 120 (STEP 5-2) are respectively identical to STEPs 4-1 and 4-2 in which the backup data is restored to the identical controller. The subsequent steps differ from the steps performed for the same controller.

Having received the backup data, calculator 121 of controller 120 checks the "state" (enabled or disabled) of each optional function in nonvolatile memory unit 123 (STEP 5-3).

If any of the optional functions of the data-restoring controller have been enabled, calculator 121 rewrites data contained in nonvolatile memory unit 123 (STEP 5-4). More specifically, calculator 121 reads data contained in the modifiable region from the backup data stored in volatile memory unit 122, and sequentially modifies data in the modifiable region of nonvolatile memory unit 123. Calculator 121, however, does not modify the data contained in the state storage unit, the production-number storage unit, and the effective-time storage unit of the optional functions in the modifiable region. In other words, the backup data of the optional functions does not reflect unlike in STEP 4-3. As a result, after the backup data is restored, the data-restoring controller maintains the "state" (enabled or disabled) of the optional functions and the "production number", and the remaining items have the same settings as those in the data-saving controller.

If, on the other hand, all the optional functions of the data-restoring controller have been disabled, calculator 121 rewrites data contained in volatile memory unit 122 (STEP 5-5). Volatile memory unit 122 stores an image file, which has the same memory structure as the image file of nonvolatile memory unit 123. First, calculator 121 checks the "state" (enabled or disabled) of the optional functions in the backup data stored in volatile memory unit 122. If any optional function is in the enabled state, calculator 121 rewrites the state as "temporarily enabled". Calculator 121 then clears the data from the serial-number storage unit assigned for the optional function. Calculator 121 then rewrites the "effective time" in the effective-time storage unit to the number of counts predetermined by the program. Calculator 121 then sequentially rewrites data contained in the modifiable region of nonvolatile memory unit 123 according to the rewritten data of volatile memory unit 122 (STEP 5-6). As a result, after the backup data is restored, the optional functions that were enabled in the data-saving controller are modified to be "temporarily enabled" in the data-restoring controller. The remaining items have the same settings as those in the data-saving controller. The steps of restoring the backup data in the data-restoring controller, which is a controller different from the data-saving controller, are referred to as a tenth step.

The action of the present exemplary embodiment will now be described as follows.

In the present exemplary embodiment, whether the backup data is restored for the system recovery of the same controller or for the setup of a different controller is determined as follows. A comparison is made between the controller's "production number" stored in the non-modifiable region of nonvolatile memory unit 123 in the data-restoring controller and the data-saving controller's "production number" in the backup data stored in the recording medium. Comparing these controllers' "production numbers", which are unique to each individual controller 120, can determine the purpose of restoring the backup data. When the data-saving controller and the data-restoring controller are identical (the controllers' "production numbers" are identical), the purpose is system recovery. In this case, the controller, including the authentication of optional functions, can be recovered by recovering the "states" and "serial numbers" of the optional functions.

When, on the other hand, the data-saving controller and the data-restoring controller are different from each other (these controllers' "production numbers" are different), the purpose is to use the settings set in the master cell for another cell. In the present exemplary embodiment, when the backup data is restored by a data-restoring controller different from the data-saving controller, the "state" of the optional functions of the data-restoring controller is checked. If any of the optional functions have been enabled, the "state" and "serial number" of the optional functions are not restored. This prevents the optional function enabled in the data-restoring controller from being disabled by the backup data of the data-saving controller.

If, on the other hand, all the optional functions of the data-restoring controller are in the disabled state, the optional functions enabled in the data-saving controller are rewritten to be "temporarily enabled" in the data-restoring controller. This prevents the licenses of the optional functions of the data-saving controller from being copied to the data-restoring controller.

The optional functions enabled in the data-saving controller are temporarily enabled and used for a certain period of time in the data-restoring controller. This eliminates the need for the data-restoring controller to immediately perform an authentication procedure, thereby improving the operating efficiency.

The optional functions in the data-restoring controller become unusable when the period of time has elapsed. The data-restoring controller, however, can have the same settings including the optional functions as the data-saving controller by applying the same authentication as in the first exemplary embodiment. In short, the optional functions of the data-restoring controller can be changed from being temporarily enabled to being enabled for an unlimited period of time.

In order to copy the settings of the optional functions of the data-saving controller to the data-restoring controller, the optional functions of the data-saving controller must be authenticated in the data-restoring controller in the same manner as in the first exemplary embodiment. Because the authentication provides the same result before and after the restoration of the backup data, the user does not have to be conscious of the timing of performing authentication. This improves the operating efficiency.

In the present exemplary embodiment, the data-restoring controller has a region for temporarily receiving the backup data in volatile memory unit 122 where the backup data is rewritten when necessary. Instead of being temporarily received in the region provided in volatile memory unit 122, the backup data can alternatively be rewritten in teach pendant 130, be transferred to the data-restoring controller, and be modified in nonvolatile memory unit 123.

In the first to fourth exemplary embodiments, the recording medium is connected to teach pendant 130 to perform various operations, but may alternatively be connected to controller 120.

INDUSTRIAL APPLICABILITY

According to the present disclosure, the optional functions of the electrical apparatus, for which the recording medium containing the license file is authenticated, can be enabled without the need for a person from the manufacturer to visit the manufacturing premise. Therefore, the present disclosure is industrially useful as a method of enabling and disabling optional functions and also as a method of transferring information on enabling and disabling the optional functions.

REFERENCE MARKS IN THE DRAWINGS 110 manipulator
111 first industrial robot
112 second industrial robot
120 controller
121 calculator
122 volatile memory unit
123 nonvolatile memory unit
124 power-on-time measurement unit
125 servo amplifier
126 communication unit
130 teach pendant
131 calculator
132 setting data display unit
133 operating unit
134 media connection unit
135 communication unit
140 recording medium
141 memory region
142 individual identification information
143 memory region
144 license file
145 media identification information
146 option information
147 optional-function serial-number information
148 license status information
149 authentication log file

The invention claimed is:

1. A method of controlling optional functions performed by at least one electrical apparatus, the electrical apparatus including a non-transitory memory storing a program and a hardware processor configured to execute the program so as to perform the method of controlling the optional functions performed, the method comprising:

a first step of establishing a connection between a first recording medium and a first electrical apparatus without using an internet connection, the first electrical apparatus having optional functions either disabled or temporarily enabled and the first recording medium containing license information to enable a first optional function performed by the first electrical apparatus;

a second step of allowing the first electrical apparatus to authenticate the license information the first electrical apparatus verifying individual identification information recorded in the first recording medium by comparing it with media identification information contained in the license information;

a third step, subsequent to the second step, of enabling the first optional function performed by the first electrical apparatus based on the license information authenticated, the first optional function being previously disabled and not able to performed by the first electrical apparatus, the first electrical apparatus storing a serial number of the first optional function stored in the first recording medium; and a fourth step, subsequent to the third step, of recording the first optional function as having been enabled in the license information stored on the first recording medium, and setting a license authentication status in the first recording medium as having been authenticated;

a fifth step, subsequent to the fourth step, of establishing a connection between a second recording medium and the first electrical apparatus without using the Internet connection, the second recording medium being different from the first recording medium;

a sixth step, subsequent to the fifth step, of disabling the first optional function performed by the first electrical apparatus based on verifying the authentication status of the license information stored in the first recording medium, the first operational function being previously enabled and able to be performed by the first electrical apparatus, and the serial number stored in the first electrical apparatus being recorded in the second recording medium; and a seventh step, subsequent to the sixth step, of recording the first optional function in the second recording medium as being authenticated in the license information.

2. The method controlling optional functions of claim 1, wherein, in the fourth step, a production number of the first electrical apparatus is stored in the first recording medium as a first log.

3. The method of controlling optional functions of claim 1, wherein in the seventh step, a production number of the first electrical apparatus is stored in the second recording medium as a second log.

4. The method of controlling optional functions of claim 1, further comprising an eighth step, prior to the first step, of changing the first optional function of the first electrical apparatus from being disabled to being temporarily enabled without using the first recording medium.

5. The method of controlling optional functions of claim 1, further comprising:

a ninth step of storing option setting information and a setup program of a second electrical apparatus on the first recording medium, the second electrical apparatus being different from the first electrical apparatus and having enabled optional functions indicated in the option setting information; and a tenth step, subsequent to the ninth step and prior to the first step, of copying the setup program and the option setting information of the second electrical apparatus to the first electrical apparatus, wherein during the tenth step, all optional functions of the first electrical apparatus are in a disabled state, and in the tenth step, all enabled optional functions contained in the option setting information of the second electrical apparatus are indicated as temporarily-enabled optional functions on the first electrical apparatus.

6. The method of controlling optional functions of claim 1, further comprising:

a ninth step of storing option setting information and a setup program of a second electrical apparatus on the first recording medium, the second electrical apparatus being different from the first electrical apparatus and having enabled optional functions indicated in the option setting information; and a tenth step, subsequent to the ninth step and prior to the first step, of copying the setup program of the second electrical apparatus to the first electrical apparatus, wherein during the tenth step, at least one optional function of the first electrical apparatus is enabled, and in the tenth step, the option setting information of the second electrical apparatus is not copied to the first electrical apparatus.

* * * * *